(12) United States Patent
Malcolm

(10) Patent No.: US 6,256,631 B1
(45) Date of Patent: Jul. 3, 2001

(54) AUTOMATIC CREATION OF HYPERLINKS

(75) Inventor: Jerry Walter Malcolm, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/940,459

(22) Filed: Sep. 30, 1997

(51) Int. Cl.[7] .................................................. G06F 17/30
(52) U.S. Cl. ........................ 707/10; 707/104; 707/501; 707/513
(58) Field of Search ............................. 707/10, 104, 501, 707/506, 513, 1, 5

(56) References Cited

U.S. PATENT DOCUMENTS

| 5,708,825 | * | 1/1998 | Sotomayor | 707/501 |
| 5,752,022 | * | 5/1998 | Chiu et al. | 707/10 |
| 5,781,914 | * | 7/1998 | Stork et al. | 707/506 |
| 5,835,712 | * | 11/1998 | DuFresne | 709/203 |
| 5,895,470 | * | 4/1999 | Pirolli et al. | 707/102 |

FOREIGN PATENT DOCUMENTS

0778534 A1    6/1997    (EP).

OTHER PUBLICATIONS

JAPIO Accession No. 05033227 & JP070325827A (Mitsubishi) Dec. 12, 1995 (see abstract).

Windows Sources vol. 5, No. 7, Jul. 1997, B Dysel, "A bright future for an old favorite", pp. 72–73, and also IAC Accession No. 19520508.

IBM Technical Disclosure Bulletin vol. 37 No. 01 Jan. 1994, Automatic Reference Generation for Hyperlink Printouts.

* cited by examiner

Primary Examiner—Kim Vu
Assistant Examiner—Shahid Alam
(74) Attorney, Agent, or Firm—Jeffrey S. LaBaw

(57) ABSTRACT

Creating hyperlinks in a document is performed according to structural indicators within a set of documents. The documents are parsed for at least one structural indicator, preferably of a type of structural indicator which is likely to be present in the type of documents being parsed. Each time a structural indicator is found in a document, text proximate to, and possibly including, the structural indicator is converted to a hyperlink. In one preferred embodiment, each structural indicator is associated with its own rule for creating the hyperlink. The invention also resolves the terminus of the hyperlink as a target document, e.g., a web page on the World Wide Web. The web page may be one of the documents newly hyperlinked as the set of hyperlinked documents are stored in a directory in a web server connected to the Internet. The target document may be resolved by retrieving a set of candidate documents related in subject matter to the hyperlinks. Each hyperlink is resolved by matching the text which occurs in the hyperlink to text which occurs in selected fields of a set of candidate target documents, e.g., a title field.

20 Claims, 4 Drawing Sheets

US DISTRICT COURT — 83
SOUTHERN DISTRICT OF NY
HERTZ CORP V. AVIS INC. — 81

NOVEMBER 3, 1994

1. UNFAIR AND FALSE ADVERTISING - LANHAM ACT SECTION 43(A)
   ⎿ 79

CITYBANK N. A. V. CITY TRUST — 71

MAMIYA CO. V. MASEL SUPPLY CO. CORP. — 73

SEE   MCNEIL P. C. C., INC V. BRISTOL MEYERS SQUIBB CO
ALSO
                                                    ⎿ 75
77

FIG. 2

AUTOMATIC CREATION OF HYPERLINKS

BACKGROUND OF THE INVENTION

This invention relates generally to hyperlinks between interrelated documents. More particularly, this invention relates to automatically creating hyperlinks in documents for a plurality of interconnected web pages on the World Wide Web.

The Internet, and particularly the World Wide Web, is gaining increasing popularity. A user typically navigates the World Wide Web by use of a network browser such as Netscape Navigator. The user will type in or otherwise provide a Uniform Resource Locator (URL) to the browser to link to a particular web server which serves a particular web page. The user may continue to navigate in this manner by providing URLs to the browser.

One of the more important ways to navigate on the World Wide Web is by use of hyperlinks in the web pages. The hyperlink is usually indicated by a different color of text or graphic indicating that a link is available at the location in the page. When the user clicks on such a hyperlink, an associated web page or web site with additional or related information on the subject is presented to the user by the browser. The link to the new page, which may be on the same web server or a geographically remote web server, is accomplished by the fact that the URL is provided to the browser upon actuation of the hyperlink. Hyperlinks have embedded in them the URL of the link target. There are some assumptions with the qualification of the URL. For instance, if the hyperlink URL is abc.html, then the assumption is that it is referencing another page in the same directory on the same server as the page containing the link. For instance, when currently viewing a URL: http://www.mywebsite.com/foopages/xyz.html, and it contained the abc.html link, the assumption is that it is in the same directory, so the browser issues an http request to http://www.mywebsite.com/foopages/abc.html. This is only a shorthand specification and allows relocation of the site. Hyperlinks otherwise are fully-qualified URLs. One can add a hyperlink to a personal home page: http://www.yahoo.com/news/sports. Clicking on that link is identical in the browser to going to the URL line and typing that string to go to Yahoo sports.

While the World Wide Web has an ever growing amount of information presented on the growing number of web pages, many of the pages of information which could be published in a web page format today predate the web technology. These pages of information typically do not have hyperlinks placed in appropriate locations within the page. This preexisting information could be manually edited and hyperlinks could be manually inserted in appropriate places. For large documents with many related references, the effort required would be very great. Thus, despite the existence of other related information, the manual effort required discourages the addition of hyperlinks in these documents. Nonetheless, if hyperlinks were installed in these pages, they would be more useful to the user. Therefore, it would be desirable to automatically generate hyperlinks in existing files to convert the files to a set of interrelated web pages.

In the prior art, it has been suggested that a hyperlinked document could be created by parsing an existing document using keywords. The parser is presented with a list of keywords and generates a hyperlink to another part of the hyperlinked document at the position of the keyword. There are several problems with the approach. In most cases, the user has no prior knowledge of the words that a document might contain. Therefore, the prior art method forces a user to read the document beforehand, either to choose new keywords, to assign an existing list of keywords or to choose another document from which a list of keywords can be generated. This effort can be so great that it is little better than generating the hyperlinks manually. Further, in many cases, common keywords are of no use whatsoever; hyperlinks should be generated at places in the document where very unusual words occur. Also, where keywords occur in adjacent positions, two hyperlinks can be created where one or possibly none would be more appropriate.

The present invention provides another solution to the problem.

SUMMARY OF THE INVENTION

Therefore, it is an object of the invention to automatically generate hyperlinks in existing documents.

It is another object of the invention to convert existing documents into a plurality of web pages in which a plurality of hyperlinks refer to other pages.

It is another object of the invention to link a page to a newly created link.

It is another object of the invention to link an existing page in the web to a newly created hyperlink.

These and other objects are accomplished by creating hyperlinks in a document according to structural indicators within the documents or set of documents. The documents are parsed for at least one structural indicator, preferably of a type of structural indicator which is likely to be present in the type of documents being parsed. Each time a structural indicator is found in the document, text proximate to, and possibly including, the structural indicator is converted to a hyperlink. In one preferred embodiment, each structural indicator is associated with its own rule for creating the hyperlink.

The invention also resolves the terminus of the hyperlink as a target document, e.g., a web page on the World Wide Web. The web page may be one of the documents newly hyperlinked as the set of hyperlinked documents are stored in a directory in a web server connected to the Internet. The target document may be resolved by retrieving a set of candidate documents related in subject matter to the hyperlinks. Each hyperlink is resolved by matching the text which occurs in the hyperlink to text which occurs in selected fields of a set of candidate target documents, e.g., a title field.

A home page for the newly hyperlinked documents may be created on the web server containing the URL for at least one of the hyperlinked documents.

BRIEF DESCRIPTION OF THE DRAWINGS

These objects, features and advantages will be more readily understood with reference to the attached figures and following description.

FIG. 2 shows an excerpted version of an existing document in which hyperlinks can be created according to the present invention.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (TM) line of computers which run on the AIX (TM) operating system.

Figure 1:
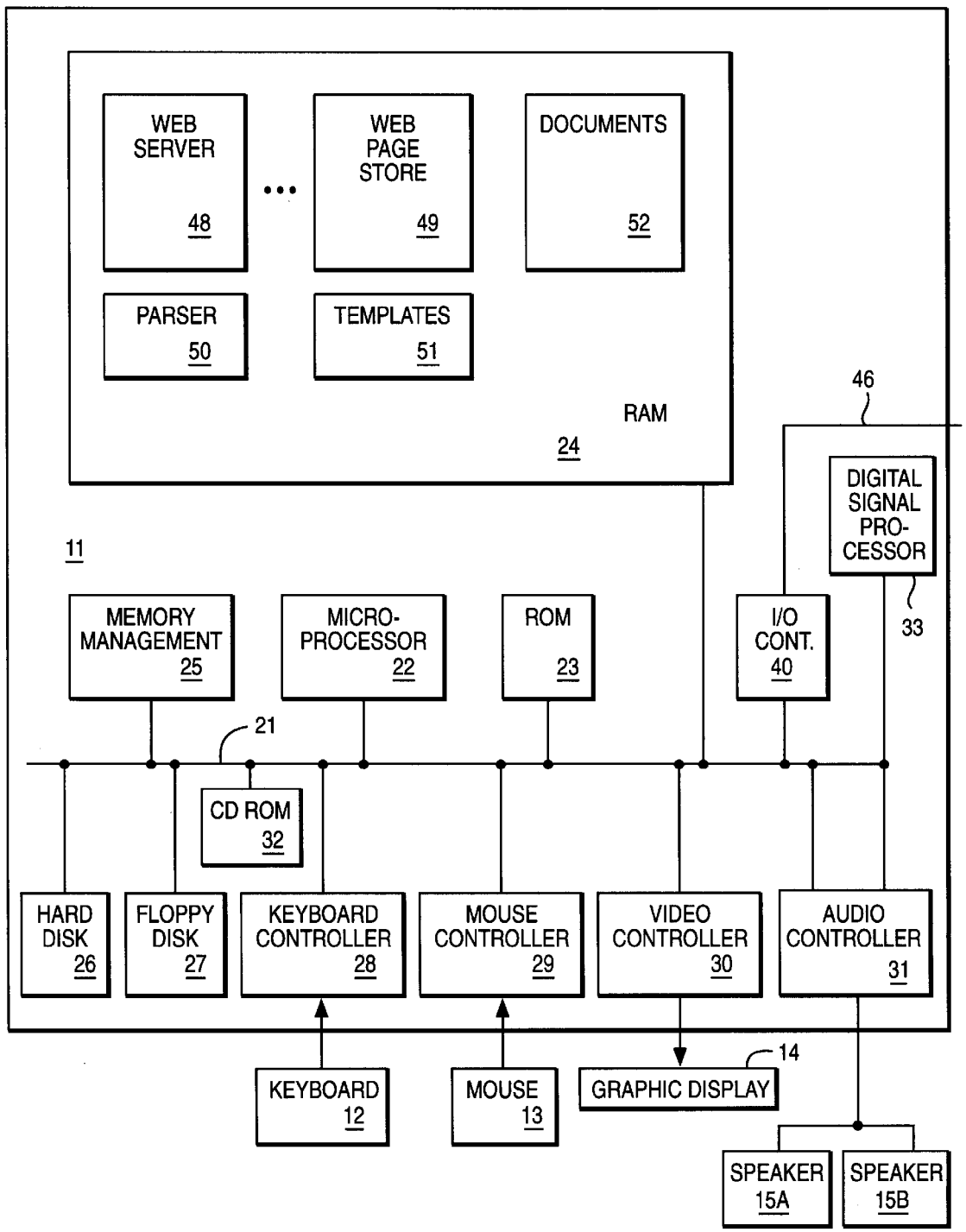
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

The present invention parses an existing document for an identifiable structure to identify the location in the document which would serve as a good hyperlink. For example, in court opinions, other court opinions on similar matters are typically referenced in the form of Plaintiff's name v., Defendant's name (XXXXX v. YYYYY) with a number of references to court reporters. Using the XXXXX v. YYYYY structure, the court opinion can be parsed to generate hyperlinks to every court opinion cited in the document.

As shown in FIG. 2, an extracted version of a court opinion is depicted. As shown three court opinions 71, 72 and 73 have been identified in the document as cites to other court opinions by using the "v." structural indicator. This illustrates the strength of the present invention as opposed to the keyword method of the prior art. While a dictionary of large businesses could possibly locate a cite like Citybank, N.A. v. Citytrust 71, it would be unlikely that such a lexicon would find the Mamiya Co. v. Masel Supply Co. Corp. court citation 73. A lexicon of only the top corporations would locate relatively few court opinions; developing a lexicon which would locate an acceptable number of hyperlink locations would be an enormous, perhaps impossible task. Furthermore, even if such a lexicon were developed, the processing time required for such searches would be extremely expensive in processing resources. The structure of a document which is predictable, common to a class of documents and occurs frequently within the documents can be effectively used to identify the appropriate hyperlinks. The words in the hyperlinks themselves are typically uncommon in documents. It is therefore very difficult to predict their occurrence in any set of documents. The present invention which uses structure within a document is much more practical.

The reader will have observed that certain types of structure are recurring words or other alphanumeric text which is likely to exist in a document. The "v." structure has already been discussed above as particularly useful for locating court opinion hyperlinks. Also, in the figure, the "see also" text string 77 which precedes the McNeal cite 75 is another example of an alphanumeric based type of structure. "See also" is a notable indicator, not only for a court opinions, but also for other types of references such as encyclopedias for potential hyperlinks to other references on a subject. These types of structure are distinct from the use of keywords in the prior art; while some are words themselves, they are not the part of the hyperlink which is useful for resolving the newly created hyperlink to a target document. Indeed, because of their frequent occurrence in similar types of documents, they are useless for resolving the hyperlink.

There are other types of structural indicators for creating a suitable hyperlink. Also in FIG. 2, section titles 79 within the document can also provide a good hyperlink. The section title 79 in FIG. 2 could provide a first hyperlink to "unfair and false advertising" in general as well as a second hyperlink to "Section 43(A) of the Lanham Act". Section titles could also be used to break up a long document into a set of web pages, by using them as titles of the web pages as described below, and giving each section its own URL. Other representative structural indicators include capitalized, underlined or italicized text.

Since the court opinions have a predictable format, structure could also be used to determine the title of the document which will become the hyperlinked page. The title is useful to provide a reference for the hyperlinked page as a target document for a newly created hyperlink in another page. In this example, the Hertz Corp. v. Avis Inc. citation 81 signifies the title for the modified document. The title U.S. District Court Southern District of New York 83 could provide the subdirectory in which this document could be placed, e.g., /cases/sdny/.

Once the hyperlink is located, the next part of the invention is to generate a valid web URL from the text associated with the structural indicator. One typical rule in the case of a court opinion might be to convert the period and space to underscores and then add underscore court case .HTML to the stream. Therefore, a typical hyperlink to a URL would be:

<a href=XXXX_v_YYYY_courtcase.html>XXXX v. YYYY</a>

Other hyperlink rules for other types of documents and hyperlinked text could be variants of this rule. Note that the rules for creating the URLs and the titles of the web pages are identical in the preferred embodiment. Assuming that one has created or will create a web page with the title to which the newly created hyperlink is pointing, the hyperlinks will be easily resolved. Where an existing web page with an existing URL will be used as a target, either knowledge of the URL or the matching algorithm of FIG. 4 could be used to change the hyperlink text to the proper URL.

Figure 3:
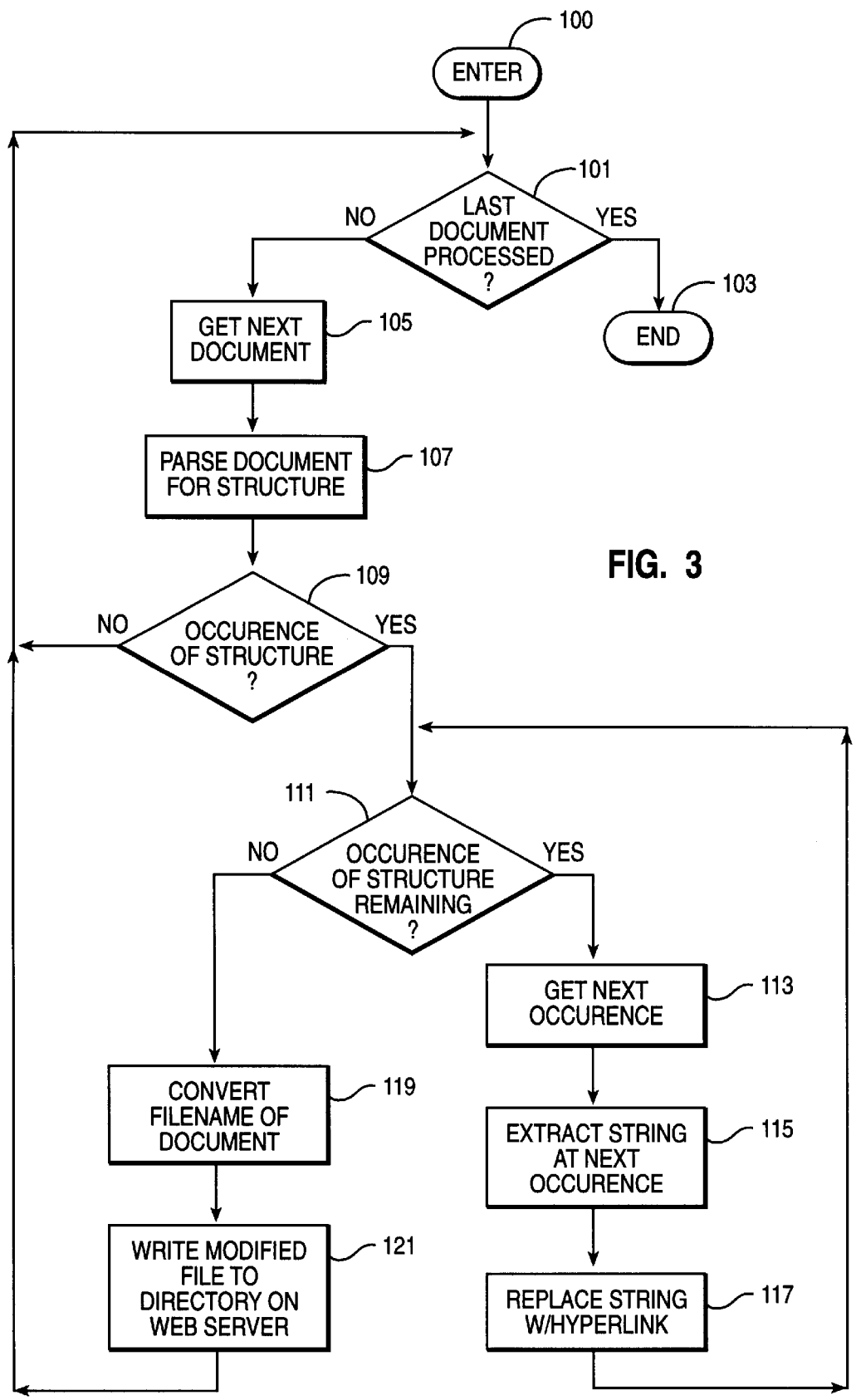
FIG. 3 is a flow diagram for creating hyperlinks in an existing document according to the present invention.

FIG. 3 is a flow diagram of the process to create links within a document. The process begins step 100 when the users have selected a set of documents to be processed. The test in step 101 determines whether the last document in the set has been processed. If so, the process ends in step 103.

When the process begins the first document in the set is retrieved in step 105 where the queue of documents is examined for the next document in the queue. In step 107, the document is parsed for structure. The structure as discussed above, could be the "v." for court opinions, "see also", titles, italics or other special cases or fonts within the document. Step 109, determines whether structure was located within the document, if not the process returns to step 101. If structure was located in the document, the process proceeds to step 111 which tests whether there is any remaining structure in the document. In step 113, the first located occurrence of structure is retrieved, e.g., "v.".

In step 115, the text string associated with the occurrence of structure is extracted from the document. Again, in the case of the court opinion that would be Plaintiff's name v. Defendant's name. The rules for text extraction and conversion to hyperlinks will vary to some degree with the type of structure located. Next, in step 117, the extracted string is replaced with the hyperlink. The case of the court opinion is discussed above. Next, the process returns back to step 111 to determine whether there are any other occurrences of structure within the document.

Once all of the occurrences of structure have been processed. In step 119, the file name of the document is converted. In the case of a court opinion, the file name rule could be to convert the parsed title, aaaaa v. bbbbb, to the form of "aaaaa_v_bbbb_courtcase.html. In step 121, the modified file is written to the appropriate directory or subdirectory on the web server. In the case of a court opinion it could be a directory name "/cases/" on the web server computer.

Once all of the hyperlinks have been created in the documents of the library, there may be a related problem also solved by the invention. If all of the newly created hyperlinks point to newly created web pages both titles and hyperlinks are created according to the same rules, the job may be done. However, some of the newly created links may be unresolved the terms of the target documents to which they point, either because there may be no created web page or the hyperlink is supposed to point to an external URL.

Figure 4:
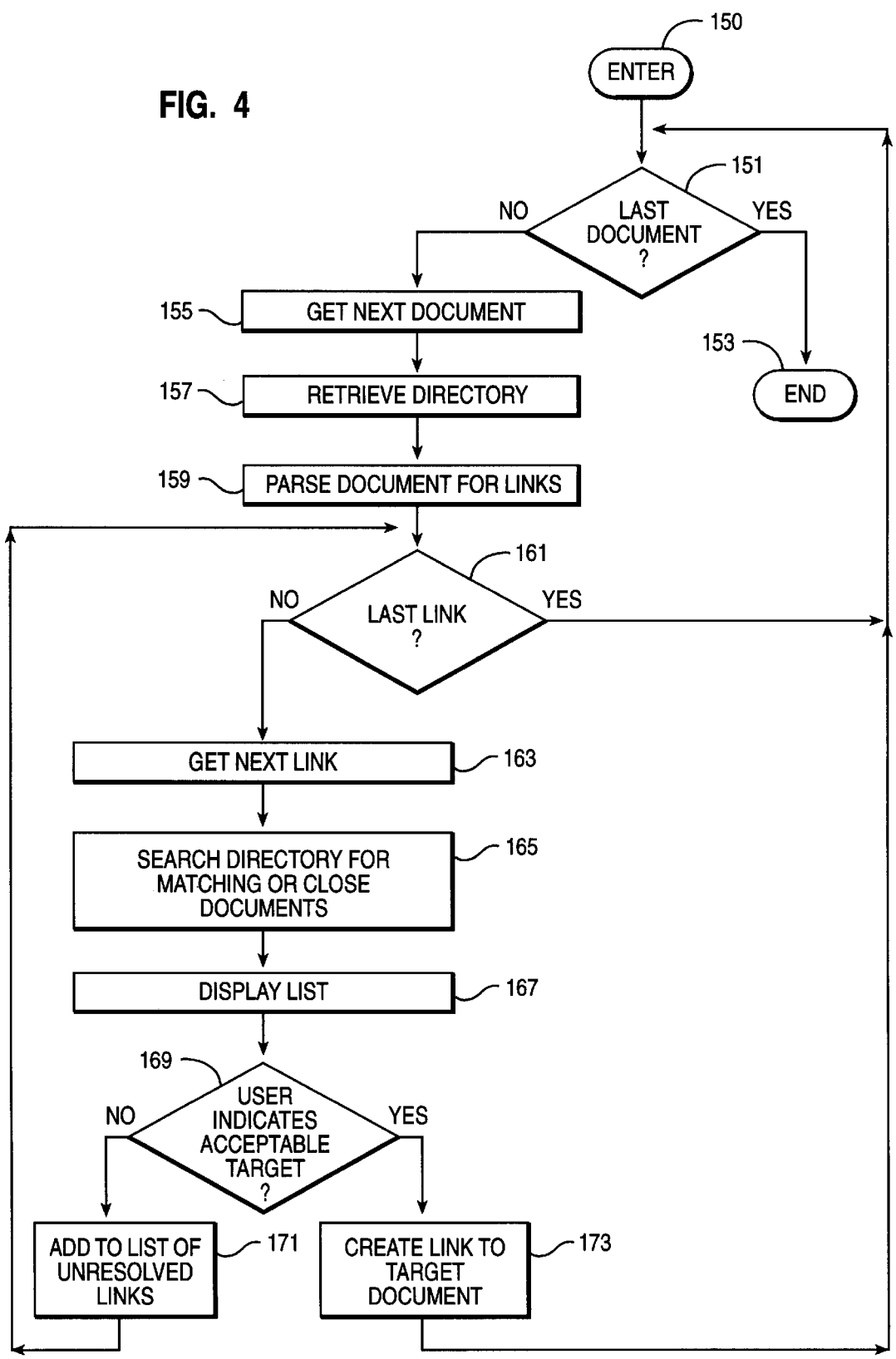
FIG. 4 is a flow diagram for linking a newly created hyperlink to a target document according to the present invention.

FIG. 4 shows one possible automated way of resolving the hyperlinks and finding target documents, i.e. URLs for the newly created hyperlinks. The process begins in step 150 and proceeds to the test in step 151 to determine whether the last document in a set has been examined, if so the process ends in step 153. If not, which is true at the beginning of the resolving process, the next document is retrieved in step 155.

In step 157, a directory of related documents is retrieved as a set of possible targets for the hyperlink. This step is optional, if there is no related set of documents or if a search of the web for relevant URLs is preferred. However, in the preferred embodiment, the process of FIG. 3 has just created a set of related documents to which many of the newly created hyperlinks can be resolved. In the example of court opinions, it may be the /cases/ directory. Note that the process of creating hyperlinks should be organized properly so that the documents written earliest in time are parsed for hyperlinks first. Directories of these earlier documents will form the basis for most of the targets of later documents since it is very rare that an early document, unless revised, will refer to one written at a later time.

Next, in step 159, the document is parsed for the newly created hyperlinks. The test in step 161 determines whether the last link in the current document has been processed. If so, the process returns to step 151. If not, which is initially the case the next link is retrieved in step 163. In step 165, the directory is searched for matching or close documents. In the preferred embodiment, this step will merely be a check that the web page exists for the hyperlink. Generally, if the rules have not been followed uniformly this step searches titles of the documents for words which also occur in the hyperlink to be resolved. The search is for at least one identically spelled or closely spelled word in both the hyperlink and the title of the document. In certain types of documents, there may be fields other than the titles which could be particularly relevant to resolving the hyperlink. Thus, the rules for selecting candidate documents for resolving hyperlinks can vary according to the type of target documents in the directory.

In step 167, the list of candidate documents is displayed to the user. In many cases, the list will be a single document. The user is queried to either select a document from the list or to indicate that none of the candidate documents are acceptable. In step 169, the test indicates whether the user has indicated that there is an acceptable target document. If not, the link is added to a list of unresolved links for the document. The list of unresolved links in the document will be useful for the user to either manually resolve the links or to engage in other searching such as a web based search or searches in other directories for the links. Alternatively, the user may elect to prune unresolved hyperlinks from the list and convert them back to normal text using an automatic process which is the opposite of the link creation rule. If the user indicates that there is an acceptable target document, step 173 adjusts the link to the target document if necessary the process returns to step 151. Where the process is used as a check for a set of web page documents, many of the hyperlinks will need no adjustment. Where an external URL is retrieved, rather than deriving a URL based on the method or the rule of particular type of document the external URL would be used.

The invention envisions that templates could be created for a certain types of documents. These templates would be retrieved whenever a document of this type was processed according to the invention, either for the creation or resolution of hyperlinks. For example, there might be a court opinion template which tells the parser to look for particular types of structure which are likely to be encountered, and therefore, likely to create useful links.

Another type of template might be for a programming reference for an API set. Assuming that the user had all of the documentation for a particular API set, a signature would always start with a fairly small set of prefixes, e.g., "win", "gpi", "dev" and so forth. The structures within the APIs typically follow a fairly rigid naming convention. A template could be derived to process all of the documentation for the API set, creating files with hyperlinks and naming them appropriately so that they can themselves be referenced by other API or data structure files.

Further, as with any web site, one would typically want to create an additional Home Page for a starting point for the newly created set of documents. The Home Page might point to the first file in a logical progression, or more likely, contain a table of contents with links to many of the files in the library.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

I claim:

1. A method for creating hyperlinks in a document, comprising the steps of:

parsing the document for at least one structural indicator; and responsive to finding a structural indicator in the document, converting text proximate to the found structural indicator to a hyperlink according to a rule for the structural indicator.

2. The method as recited in claim 1 further comprising the step of resolving a target document of the hyperlink as a web page on the World Wide Web.

3. The method as recited in claim 1 further comprising the steps of:

parsing the document for a structural indicator indicative of a title; and responsive to finding a title structural indicator in the document, converting text proximate to the structural indicator to a title for the document according to a rule for the structural indicator.

4. A method for creating hyperlinks in a set of documents of a first type, comprising the steps of:

parsing the set of documents for structural indicator which typically occur in the first type of documents; and responsive to finding a plurality of structural indicators in the set of the documents, converting text proximate to each of the plurality of structural indicators to a respective hyperlink according to rules for each of the structural indicators.

5. The method as recited in claim 4 further comprising the step of retrieving a predefined template of structural indicators to be used for parsing the first type of document.

6. The method as recited in claim 4 further comprising the step of resolving a target document of at least one hyperlink as a web page on the World Wide Web by searching for URLs which match the converted text in the at least one hyperlink.

7. The method as recited in claim 4 further comprising the step of storing the set of hyperlinked documents in a directory in a web server connected to the Internet.

8. The method as recited in claim 7 further comprising the step of creating a home page for the hyperlinked documents containing the URL for at least one of the hyperlinked documents.

9. The method as recited in claim 4 wherein the rules for different structural indicators for creating hyperlinks are different.

10. The method as recited in claim 5 wherein a type of field searched in the set of candidate documents is according to a rule for the first type of documents.

11. A computer program product in a computer readable medium for creating hyperlinks in a document, comprising:

means for parsing the document for at least one structural indicator; and means responsive to finding a structural indicator in the document for converting text proximate to the structural indicator to a hyperlink.

12. The product as recited in claim 11 further comprising means for resolving a target document of the hyperlink as a web page on the World Wide Web.

13. The product as recited in claim 11 further comprising:

means for parsing the document for a structural indicator indicative of a title; and means responsive to finding a title structural indicator in the document for converting text proximate to the structural indicator to a title for the document according to a rule for the structural indicator.

14. A system for creating hyperlinks in a set of documents of a first type, including processor, memory, input devices and display comprising:

a parser for parsing the set of documents for structural indicator which typically occur in the first type of documents; and means responsive to finding a plurality of structural indicators in the set of the documents for converting text proximate to each of the plurality of structural indicator to a respective hyperlink according to rules for the structural indicators.

15. The system as recited in claim 14 further comprising:

a set of predefined templates of structural indicators for parsing different types of documents; and means for retrieving a predefined template of structural indicators for the first type of document for use by the parser.

16. The system as recited in claim 14 further comprising means for resolving a target document of at least one hyperlink as a web page on the World Wide Web by searching for URLs which match the converted text in at least one hyperlink.

17. The system as recited in claim 14 further comprising means for storing the set of hyperlinked documents in a directory in a web server connected to the Internet.

18. The system as recited in claim 17 further comprising means for creating a home page for the hyperlinked documents containing the URL for at least one of the hyperlinked documents.

19. The system as recited in claim 14 wherein the rules for creating hyperlinks are different for different identified structural indicators.

20. The system as recited in claim 17 wherein a type of field searched in the set of candidate documents is according to a rule for the first type of documents.

* * * * *

UNITED STATES PATENT AND TRADEMARK OFFICE
CERTIFICATE OF CORRECTION

PATENT NO. : 6,256,631 B1
DATED : July 3, 2001
INVENTOR(S) : Malcolm

It is certified that error appears in the above-identified patent and that said Letters Patent is hereby corrected as shown below:

Column 7,
Line 58, please delete "and";
Line 62, after "indicator." please delete "." and insert --; and resolving a target document of the hyperlink by matching the converted text which occurs in the hyperlink to text which occurs in selected fields of a set of candidate target documents. --;
Line 64, please after "resolving" please delete "a target document";

Column 8,
Line 10, please delete "and";
Line 15, after "indicators." please delete "." and insert --; retrieving a set of candidate documents related in subject matter to the hyperlinks; and
for each hyperlink, resolving a target document of the hyperlink by matching the converted text which occurs in the hyperlink to text which occurs in selected fields of a set of candidate target documents. --;
Line 43, after "hyperlink." please delete "." and insert --; and means for resolving a target document of the hyperlink by matching the converted text which occurs in the hyperlink to text which occurs in selected fields of a set of candidate target documents. --;
Line 59, please delete "and";
Line 64, after "indicators." please delete "." and insert --; and means for resolving a target document of the hyperlink by matching the converted text which occurs in the hyperlink to text which occurs in selected fields of a set of candidate target documents. --.

Signed and Sealed this

Twenty-fourth Day of December, 2002

JAMES E. ROGAN
*Director of the United States Patent and Trademark Office*